United States Patent [19]
Hoadley

[11] 3,999,253
[45] Dec. 28, 1976

[54] CABLE GRIP

[75] Inventor: John Richard Hoadley, Uncasville, Conn.

[73] Assignee: Harvey Hubbell Incorporated, Orange, Conn.

[22] Filed: May 12, 1975

[21] Appl. No.: 576,856

[52] U.S. Cl. .............................. 24/115 N; 403/291
[51] Int. Cl.² ........................................ F16G 11/00
[58] Field of Search .............. 294/86 CG; 403/291; 24/115 N, 131 C; 174/72 A, DIG. 12

[56] References Cited
UNITED STATES PATENTS

| | | | |
|---|---|---|---|
| 782,657 | 2/1905 | Hubert | 24/131 C |
| 1,663,063 | 3/1928 | Schneider | 24/115 N |
| 2,688,172 | 9/1954 | Kellems | 24/115 N |

FOREIGN PATENTS OR APPLICATIONS

| | | | |
|---|---|---|---|
| 560,728 | 9/1957 | Belgium | 174/72 A |
| 1,590,764 | 6/1970 | Germany | 174/72 A |

*Primary Examiner*—Werner H. Schroeder
*Assistant Examiner*—Doris L. Troutman
*Attorney, Agent, or Firm*—Jerry M. Presson

[57] ABSTRACT

A cable grip including an equalizer of plural coil construction with the coils each closely wound and spaced apart longitudinally, and receiving strand pairs of the grip. The equalizer is formed from circular section wire, and adjacent coils are spaced apart by integral wire portions in the form of a long pitch helix of about one turn. The wire construction facilitates inspection of the strands, eliminates sharp edges, and permits lateral movement of the coils with respect to each other.

16 Claims, 6 Drawing Figures

U.S. Patent  Dec. 28, 1976  3,999,253
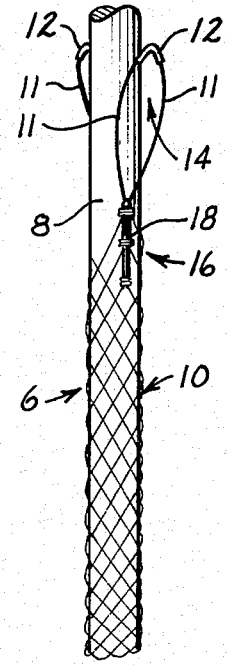
Fig. 1
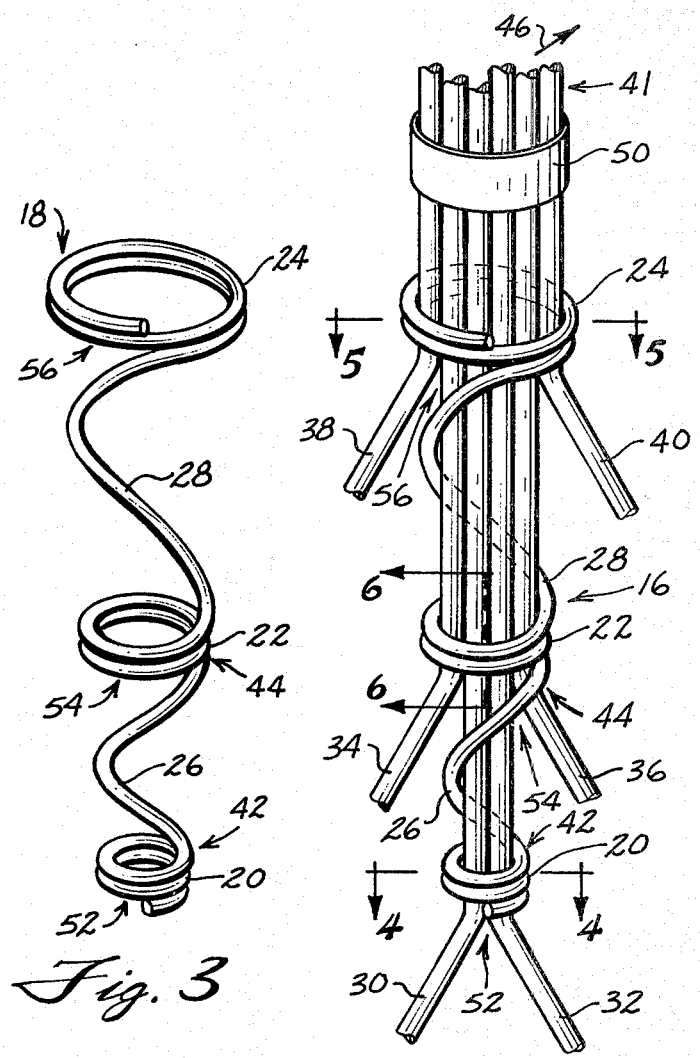
Fig. 3
Fig. 2
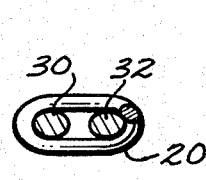
Fig. 4
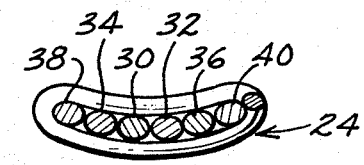
Fig. 5
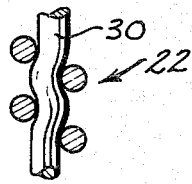
Fig 6

CABLE GRIP

This invention relates to open mesh grips known in the art as cable grips, and more particularly to a cable grip with improved strand equalizer devices for equalizing the pull in the cable strands. More particularly, the invention relates to an improved cable grip with an equalizer of unique construction at the shoulders or places at which the wires of the mesh are brought together to form the pulling or supporting loops at the draft end of such grips.

Woven wire grip devices in which crossing portions of wire strands are relatively movable to permit lateral expansion through endwise compression, or lateral compression through endwise extension are well known devices. Such grip devices are extensively used, for example, for drawing electrical cables through conduits and are usually provided at one end with a draft eye or loop adapted to be connected to a pulling cable or rope. In use of such grips the woven body is compressed axially to expand it radially, the radially expanded body is placed over the end of the electrical cable, and the draft eye or eyes are pulled to snug the grip into gripping engagement with the cable. Then, a rope or other pulling device is connected to the draft end of the grip and the cable and grip can be pulled through, for example, an underground conduit.

In U.S. Pat. No. 2,688,172 Kellems issued Sept. 7, 1954, several forms of cable grip strand equalizer arrangements are disclosed. The equalizers take the form of tubes, openings in tubes or strips struck out from a plate and through which the strands of the cable grip are extended at their shoulder or crossover points in the region near the draft end of the cable grip.

While such equalizers, as shown and described in the above mentioned patent to Kellems, work quite well and have been used with success, certain disadvantages of the Kellems cable grip equalizers have been discovered. First, the tubes or plates which form the equalizers are rigid and correspondingly equalization of the pull from the draft end of the cable grip occurs only when the pull is in a direction along the axis of the tubes or plate openings of the equalizer. This is because the tubes or plates are themselves rigid and therefore cannot flex or give when the pulling force on the draft end of the grip is at an angle to the axis of the equalizer.

An additional disadvantage of such cable grip equalizers is that they are formed from either tubing or sheet metal, usually relatively thin sheet metal, and the process of forming such equalizers by stamping and bending frequently results in sharp edges which must be rounded so that cutting of the strands of the cable grip or the cable within the grip is avoided. Such rounding of the edges of these sheet metal equalizers is expensive, and adds to the manufacturing and inspection costs of these devices.

An additional disadvantage of the cable grip and equalizer arrangement of the afore mentioned patent is that it is difficult to inspect the strands of the cable grip which pass through the equalizers since these strands are at least partially obscured by the tubing or sheet metal band which holds the strands at the desired shoulder points. As a result, faulty strands at the shoulder points are frequently not noticed until after the pulling operation begins at which time the strands part and the grip fails and it is necessary to withdraw the cable and start again.

In accordance with this invention, a cable grip is provided in which an improved strand equalizer positions selected strands of the cable grip at shoulder points adjacent the draft end of the grip. In accordance with this invention, the equalizer used to connect the strands at these shoulder points comprises one or more coils of wire with rounded edges through which the strands extend.

The equalizer, in the preferred embodiment of the grip, includes several generally helical coils similar in configuration to a helical spring, but of softer wire, and several shoulders are formed, one by each coil of the equalizer. The shoulder point defining coils are advantageously maintained in axially spaced apart relation by a generally helical turn of wire of substantial pitch integral with the coils which form the shoulder points so that the shoulder points are maintained spaced apart by the wire of the equalizer. Such an additional turn of large pitch, of the equalizer, provides reasonable longitudinal rigidity between the coils, yet has flexibility to permit flexing transversely of the coils to maintain the pull in the individual strands of the grip substantially equal even though the pulling force is transverse to the axis of the grip.

In addition, the equalizer has some axial flexibility which permits slight axial elongation to further equalize the pull in the individual strands passing through the equalizer. Since the manufacture of an equalizer according to the invention merely entails wrapping several coils of wire with a long integral turn connecting adjacent coils, such manufacture is quite inexpensive. The rounded wire is inherently free from sharp edges and thus provides a mouth area to receive the strands, which is free of stress concentration points.

In accordance with a preferred embodiment of the invention, the successive coils of the equalizer are of progressively increased diameter toward the draft end of the cable grip to accommodate the increased number of strands passing through the equalizer as the draft end of the grip is approached.

Correspondingly, a principle object of the present invention is to provide an improved form of grip and equalizer arrangement which is free of the above noted disadvantages, and which has the advantages set forth above.

Another object is an improved grip in which the surfaces of the equalizer which form the crossover or shoulder points are each smoothly rounded by virtue of the rounded wire from which the equalizer itself is formed.

A further object of the invention is an improved grip and equalizer arrangement in which the strands of the grip can be readily inspected by virtue of the relatively short axial dimension of the wire coils of the equalizer and the rounded wire itself which facilitates visual inspection of virtually any strand passing through a coil.

Additional advantages, features, and objects of the invention will become apparent with reference to the accompanying drawings which form a part of the specification.

BRIEF DESCRIPTION OF THE DRAWINGS

FIG. 1 is an elevational view of a cable grip constructed in accordance with the invention;

FIG. 2 is a detailed pictorial view on an enlarged scale of one of the shoulders or gathering points of the grip shown in FIG. 1 and showing the unique equalizer of this invention;

FIG. 3 is a pictorial view of the equalizer;

FIG. 4 is a view in section taken along line 4—4 of FIG. 2 and showing an embodiment in which an equalizer coil is deformed to grip the strands passing through the coil;

FIG. 5 is a partial view in section taken along line 5—5 of FIG. 2 and showing a coil deformed to conform to the curvature of a cylindrical article to be gripped; and FIG. 6 is a view in section taken along line 6—6 of FIG. 2 and showing the manner in which the wire of a flattened coil grips the strands.

Referring now to the drawings in detail, and particularly to FIG. 1, there is shown a gripping device 6 according to this invention. Gripping device 6 has utility for gripping an object such as cable 8 so that the cable can be pulled for example, through a duct. Body 10 of the grip is composed of a plurality of wire strands interlocked or interwoven to form an open mesh structure adapted to be placed in surrounding gripping relationship with article 8. Some examples of the form in which the grip body 10 may be made are illustrated in U.S. Pat. No. 2,017,625 Kellems (1935). The strands of the grip body 10 can be used to form the draft end and can be divided into two or more groups or branches to form one or more looped ends or eyes. In the construction shown in FIG. 1 of the drawings, the strands are shown divided to form two double branches 11, each containing a like number of strands which are preferably twisted upon each other into rope form. The outer ends of the strands in each pair of branches 11 can be inserted into opposite ends of a U-shaped metal tube 12 which is secured to these ends, for example, by tightly compressing tube 12 so that one or more pulling eyes 14 are formed.

The individual wires of the mesh body 10 are brought together at shoulder areas 16 of the grip and are held in parallel spaced relation at the shoulder areas by equalizer devices 18.

As described herein it may be understood that the body 10 of the gripping device terminates at the lower portion of equalizer 18 (when the device and equalizer are oriented as shown at FIG. 1) and that the shoulder areas of the grip extend from the lower portion of the equalizer to the upper portion of the equalizer. The branches 11 of the grip start in the upper ends of the equalizer and terminate in the metal tubes 12.

FIG. 2 shows the shoulder area 16 in detail. As shown at FIG. 2, the equalizer takes the form of a plurality of closely wound coils 20, 22, and 24 joined together by generally helical joining portions 26 and 28 integral with the coils. Joining portions 26 and 28 each comprise at least a partial helical turn of the wire from which the equalizer is formed. As shown at FIG. 2, the joining portion 26 is of approximately one turn, and the joining portion 28 is also approximately one turn, of the wire. The wire from which equalizing device 18 is formed is of circular section. It will be observed from FIG. 2 that the diameter of coil 22 is greater than the diameter of coil 20, and the diameter of coil 24 is greater than the diameter of coil 22.

Strand 30 which extends through coil 20 is a strand of a right hand turn of body 10 whereas strand 32 is a strand of a left hand turn of the body 10. Similarly, of the strands 34 and 36 which enter coil 22, strand 34 is a right hand strand and strand 36 is a left hand strand. Strands 38 and 40 are respectively right hand and left hand strands of body 10 and enter and extend through coil 24. Strands 30 and 32 extend through coils 20, 22, and 24. At coil 22 strands 30, 32 meets strands 34, 36, and these strands meet strands 38, 40 at coil 24. This group or bundle 41 of strands extending upwardly from coil 24 can be divided into equal groups to form the branches 11, explained with reference to FIG. 1.

While FIG. 2 shows coils 20, 22 and 24 with the turns of the wire from which they are formed spaced apart, such spacing is merely for purposes of illustration, and the coils are closely wound so successive turns of the respective coils preferably engage each other, but can be very slightly spaced apart. Such close wound construction is shown at FIG. 3, with the strands removed for purposes of illustration.

It will be observed from FIGS. 2 and 3 that the joining lengths or portions 26 and 28 are each relatively long compared with the longitudinal dimension (or axial height) of each coil. In the embodiment shown and described, the wire from which the equalizer 18 is formed is 1/16 inch diameter, the height of each coil is 3/16 – ¼ inch, and the axial distance between the coils is slightly greater than one inch. The longitudinal spacing of the coils, however, is determined by the crossover or gathering points of the strands which form the grip, and will therefore vary with the dimensions of the grip.

It will be observed that the regions 42, 44 where joining length 26 merges into coils 20 and 22 respectively, the helix angle of the length 26 increases with respect to the longitudinal axis of the coil so the joining length blends smoothly with the coil. Intermediate these joining regions 42 and 44 the helix angle of joining length 26 can be quite small. The configuration of the joining length 26 and 28 is essentially that configuration obtained by grasping portions of a coil spring with one turn of the spring between the grasping points, and deforming the spring beyond its elastic limit so that a portion like joining portion 28 remains when the pull is released.

Such an arrangement of joined coils permits construction of equalizer 18 so it is quite rigid axially yet, because of the torsional resiliency of the coils and the axial height of the joining lengths 26 and 28, the equalizer is transversely flexible. Such transverse flexibility enhances the load equalizing action of the equalizer in equalizing the load on the individual strands even though the pull on the strands is not in a longitudinal direction relative to the body 10 of the gripping device. For example, if the pull on loop 14 is in the direction of arrow 46, at an angle to the center line of the strand bundle 41 passing upwardly through coil 24, coil 24 can shift laterally with respect to coil 22, and coil 22 can similarly shift laterally with respect to coil 20 so that there is equalization of the load or pull on the various strands at the shoulder points.

In accordance with one aspect of this invention, each of the coils 20, 22, and 24 can be deformed or flattened after strands are threaded through the coils so that the strands are gripped by the respective coils. Such flattened coils gripping the strands are shown at FIG. 4, for the coil 20.

Where the cable grip is used with a cable of circular section, the flattened coils can be slightly curved to conform to the circumferential curvature of the cable 8, so the coils can lay flush against the cable (FIG. 5).

Satisfactory results can, however, be obtained by only deforming coil 24 into gripping engagement with the several strands which exend through this coil closest to the draft end. Such deforming of only the coil 24 into gripping engagement with the strands has been found to be satisfactory in many applications of the cable grip, since the joining portions 26 and 28 maintain coils 20 and 22 in the proper longitudinally spaced relation from coil 24, even though the forces acting on the strands tend to force the equalizer toward the draft end of the cable grip.

If desired, where none of the coils is deformed, a separate spacer or clamp 50 can be connected to the strand bundle 41 above coil 24 to prevent the equalizer from being forced upwardly when a pull is exerted on the cable grip. Downward movement of the equalizer is not significant, since a pull on loops 14 will return the equalizer to a position adjacent the clamp, as a result of the upward force exerted on the equalizer by the sides of converging strand pairs such as 30, 32.

It will be observed, with reference to FIG. 2, that the mouth or inlet portions 52, 54 and 56 of the respective coils 20, 22, and 24 are formed by the rounded wire of the equalizer, and present a smoothly rounded mouth for each coil which avoids stress concentration in the entering strands, such as strands 34, 36 which enter coil 22.

In use, body 10 of the equalizer is radially expanded by contracting body 10 longitudinally. The article 8 to be pulled is then inserted through body 10, and a pull on loops 14 extends the body axially so the strands grip radially. Further force applied to the loops tends to further elongate body 10 so it compresses further radially and tightly grips the surface of article 8.

As is apparent from FIG. 2, all the strands which pass through the respective coils 20, 22, and 24 are exposed so they can easily be inspected, and the circular wire provides smoothly rounded edges at the entry points of for example, strands 30, 32 so that there is no stress concentration at these entry points. In addition, in the embodiments where one or more coils are deformed into gripping contact with the strands, stress points are avoided as a result of wires at one side tending to push the strands between the wires at the other side of the coil, when the coil is flattened. As a result, the strands are tightly clamped and assume the S-shaped configuration shown at FIG. 6 for the strand 30.

While preferred embodiments have been shown and described, it is to be understood that numerous changes can be made without departing from the scope of the invention, as set forth herein and in the appended claims.

I claim:
1. In an open mesh gripping device comprised of, a plurality of strands interwoven to contact radially about an object upon axial extension, a shoulder area at which strand pairs extending at an angle to each other are gathered into a bundle of parallel strands and a draft end connected to the strands and beyond the shoulder area, an improved shoulder area for equalizing loading of the strands, said shoulder area comprising;
   a plurality of strand pair gathering devices each comprising
      a generally helical coil of stiff rounded wire;
   said coils being spaced apart and generally aligned longitudinally of the gripping device;
   successive pairs of strands of the gripping device extending respectively through the successive coils and secured to the draft end of the gripping device; and
   means connecting the coils in said spaced apart and generally aligned relation longitudinally of the gripping device for limited transverse movement with respect to each other so that pull on the strands of the device can equalize in the event that the strands are under different tensile stresses.

2. A gripping device according to claim 1 wherein said means connecting the coils comprises a length of said stiff rounded wire integral with adjacent coils.

3. A gripping device according to claim 2 wherein said length of stiff wire joining adjacent coil comprises at least a partial generally helical long pitch turn of said stiff wire.

4. A gripping device according to claim 1 wherein successive ones of said coils are increasing inside dimension in a direction toward the draft end of the gripping device.

5. A gripping device according to claim 1 wherein said coils are in deformed gripping engagement respectively with the successive pairs of strands of the device.

6. In an open mesh gripping device having a plurality of strands interwoven to contract radially upon axial extension, a shoulder area at which strand pairs are gathered, and a draft end joined to the strands and beyond the shoulder area, an improved shoulder area for equalizing loading of the strands, said shoulder area comprising
   strand gathering means including a plurality of coils of stiff rounded wire integrally joined together by at least a partial turn of a length of said wire of generally helical long pitch configuration, said wire length joining the coils and maintaining the coils spaced apart longitudinally of the gripping device;
   successive strand pairs of the gripping device extending through successive coils of the shoulder area; and
   means for limiting movement of said strand gathering means toward said draft end of the gripping device.

7. A gripping device according to claim 6 wherein said coils and said lengths of wire joining the coils are of a common diameter.

8. A gripping device according to claim 6 wherein said wire is of circular cross-section.

9. A gripping device according to claim 6 wherein said coils and said wire joining the coils cooperate to provide a shoulder area substantially rigid longitudinally and flexible transversely.

10. A gripping device according to claim 6 wherein said coils comprise at least three coils, each of the same hand and generally helical; and
   said wire joining adjacent ones of said coils comprise a partial helical turn of the same hand as said coils.

11. A gripping device according to claim 6 wherein said coils comprise at least three coils; and
   successive ones of said coils in a direction toward said draft end are of progressively large diameter.

12. A cable grip comprising
   a plurality of strand pair collecting elements in spaced apart relationship, the strand pairs having first substantially parallel portions within the collecting elements and second portions which join respective first portions at the collecting elements at acute angles therebetween;
   connecting means for flexibly connecting the elements in said spaced apart relationship for relative movement transverse to the axes of the first portion of the strand pairs to tend to equalize differentials in tension between the second portions of the strands collected by the elements, said means being sufficiently rigid to maintain said elements in spaced apart relationship along the first portions of the strand pairs.

13. A cable grip according to claim 12 wherein the collecting means permit movement of the strands substantially along the axes of the strands.

14. A cable grip according to claim 12 wherein the strand collecting elements have rounded strand collecting surfaces.

15. A cable grip according to claim 12 wherein the strand collecting elements are formed by a loop of wire; and the connecting means comprise a wire length.

16. A cable grip according to claim 15 wherein the strand collecting means and the connecting means comprise a single integral length of wire.

* * * * *